May 31, 1960
J. G. TEATOR
2,938,742
CABLE CONNECTOR
Filed Dec. 24, 1957
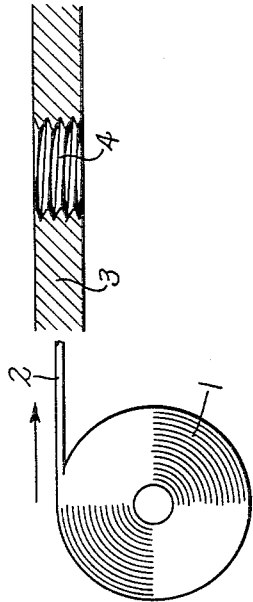
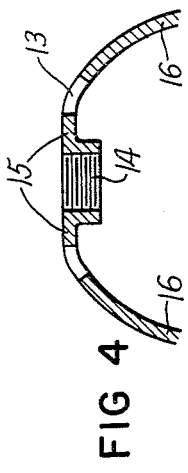
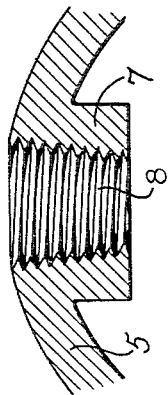
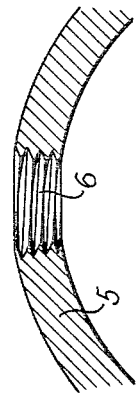
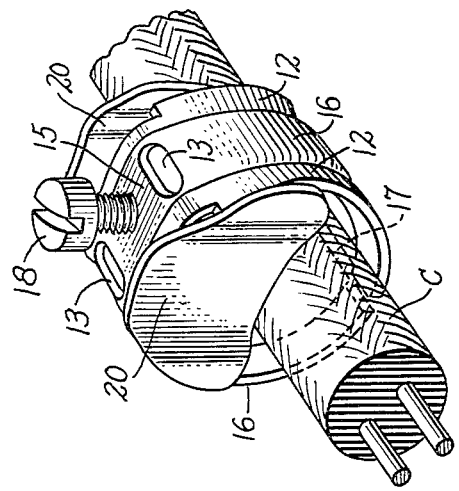
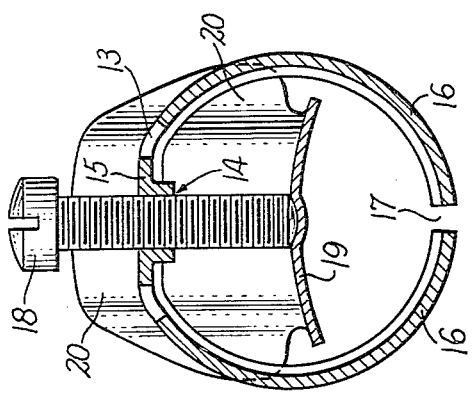
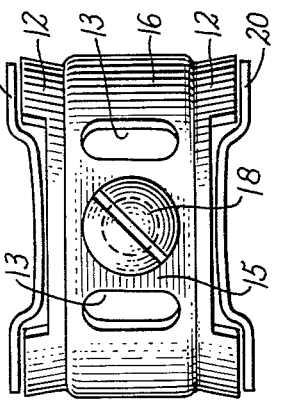
INVENTOR.
John G. Teator
BY
James C. Ledbetter
ATTORNEY

United States Patent Office 2,938,742
Patented May 31, 1960

2,938,742
CABLE CONNECTOR

John G. Teator, Linden, N.J., assignor to The Thomas & Betts Co., Elizabeth, N.J., a corporation of New Jersey Filed Dec. 24, 1957, Ser. No. 704,953

2 Claims. (Cl. 285—162)

This invention relates to a new and useful cable connector for fastening non-metallic sheathed electrical cable (sometimes called unarmored cable) within the knock-out opening of a wiring box in an electrical raceway system. Fittings of the connector class for raceways are also known, generally, as box connectors.

The particular type (species) of cable connector improved herein (for use with unarmored cable) usually has its tubular body made of thin sheet metal (cold rolled steel), i.e., die-formed or curled into ring-like shape. Such tubular body is usually split lengthwise (axially) to free it of rigidity so as to expand and anchor it by screw pressure in a raceway box.

The split body also has a threaded hole for receiving a clamping screw adapted to be set tightly for applying its clamping force against a pressure plate which, in turn, clamps and grips the unarmored cable and holds it in the tubular body without damaging the non-metallic sheath of the electrical wires in the cable.

Moreover, the clamping reaction of the screw and pressure plate against the cable acts to expand and permanently anchor the split tubular body in the knock-out hole of the raceway wiring box. Thus the screw has one operation which performs two functions. The effectiveness of its single operation implementing its dual function is important in this type of connector used with non-metallic sheathed cable.

The fact that this type of box connector has a tubular body made of thin sheet metal stock poses a limitation tending to impair the effectiveness of the screw operation and its force against the pressure plate and is one factor which begets the problem herein. The sheet stock is so thin that the internal thread helix of the screw-threaded hole is quite short and thus gets a limited grip on the external threads of the clamping screw mounted in the hole of the connector body.

The sub-class of cable connector herein improved is represented by the Peters Patent 2,445,633, issued July 20, 1948. Also, as a part of the research in solving this problem, the entirety of the prior art making up this sub-class (connector species) has been collected and made of record herein for convenience and more effectively expediting the work involved in obtaining patent protection for a simple feature in an important component of electrical raceway work of the kind employing non-metallic sheathed cable in the wiring installation.

The problem arising in such die-formed tubular bodies. for this type of cable connector, relates to the threaded screw hole which tends, during manufacture, to distort from its originally true-cylindrical form. The result is that the distorted internal threads in the screw hole may not accurately register with the cylindrical helix of the external threads on the clamping screw, thereby tending toward thread mutilation and lacking smoothness of thread registration when the clamping screw is first inserted in the threaded hole of the tubular body.

According to the foregoing explanations, the single problem herein stems from two factors, first, the thinness of the sheet metal stock in which the screw-threaded hole is formed and, second, the distortion of said hole and its threads during subsequent steps in die-forming the tubular body of the connector.

It is the purpose of this invention to solve such problem, and to do so by using the same thin stock as before, by avoiding distortion of the threaded hole during manufacture and, thereby, providing a better cable connector in a way so simple as not to unduly alter the present day method of producing the type of connector shown in the aforementioned Peters patent.

This specification with its claimed subject matter and accompanying drawings disclose the invention as preferred and embodied at this time for an understanding of the problems discovered and sought to be solved. Since these teachings may suggest structural changes to others, it will be appreciated that subsequent modifications hereof may well be equivalent in form and hence the same in spirit as this disclosure.

Figs. 1, 2 and 3

The first three views in the drawings illustrate the problem to be solved and are exaggerated enlargements (the stock being greatly thickened) to make for a better understanding of the screw-threaded hole problem herein.

The last four views show the new cable connector, with its perfected screw hole, the views being enlarged only three times over the normal trade size. These views are made from a production specimen of this new connector.

Fig. 1 shows a supply reel of sheet metal strip stock, from which both the conventional and also the improved tubular bodies are made. The stock material comprises a strip of cold-rolled steel which is fed from the reel into a die-forming machine (a multi-slide machine) for automatically cutting the strip in predetermined length pieces, also making a threaded hole in each piece, and then forming tubular bodies from them, all in the usual way. This view includes the above noted greatly enlarged (thickened) fragment of the strip stock unrolling from its reel.

Fig. 2 shows the same enlarged fragment, subsequently shaped into curvilinear form in the usual way, for producing the tubular body, with the result that the threaded hole is distorted (rendered cone-shaped or tapered) and makes a poor screw fit.

Fig. 3 is similar to conventional Fig. 2, except that an extruded (drifted) screw-threaded hole is shown (a necked hole), thus accentuating the poor screw-thread fit noted in Fig. 2. The drifted form of threaded hole is old and generally employed in order to increase the thickness of the thin strip stock, at the point where the threaded hole is formed, thereby lengthening the hole axially for providing more thread stock at that point, thus a longer thread helix.

Referring in detail to the first three conventional views, it is seen that a supply reel 1 feeds its narrow and thin strip stock (exaggerated in thickness at 3) toward the right and into a multi-slide machine of known form (not shown) for automatically cutting, forming and finishing the tubular bodies in a known manner. During the course of travel through the forming machine, the strip stock 3 is cut into pre-determined lengths and a hole is punched, and also threaded as at 4, in the same machine.

Thereafter, the cut, punched and threaded piece (shown here as the fragment 3) is curled annularly, as at 5, to make the conventional tubular body, as shown in the Peters and other prior patents. Observe that the curling operation causes the threaded hole 4 to be distorted, as at 6. It is clearly seen that the conventional threaded hole 6 has lost its true-cylindrical form and tends toward a cone-shaped, threaded hole, i.e., the inner (bottom)

end of the distorted threaded hole 6 is fractionally smaller in diameter than the outer (top) end thereof.

It is next noted that Fig. 3 represents the usual and, seemingly, the better conventional practice, comprising an extruded and threaded hole (without punching out the thin stock) in order to form a neck 7 of the metal which is extruded (saved) to form the necked hole. This is known as a "drifted" hole. It increases the thickness of the stock 5, at the point where a screw-threaded hole 8 is formed, thus providing a longer internal thread at that point in a piece of thin stock material.

By comparing Figs. 2 and 3, it is noted that the threaded necked hole 8 has the advantage of a longer screw-thread helix (more threads) than the hole 6, but that the distortion of the threads 8 in the necked hole is accentuated due to the greater axial length of its thread helix.

Observe, therefore, that the threaded necked hole 8 will have a "loose fit" at its inner end, in effect providing a "wobbling fit" with the screw. Figs. 2 and 3 emphasize the importance of solving the problem.

From the foregoing explanation, it is apparent that the cone-shaped threaded holes 6 and 8 will make a sorry "thread-wearing fit" with a standard screw. The following describes how this long-enduring problem is overcome in a simple way, without loss of advantages of present day method of manufacture, in which the conventionally thin stock is also used for making this new connector.

*Figs. 4, 5, 6 and 7*

These four views illustrate the finished cable connector, embodying the new feature herein, which solves the problem of the distorted screw-threaded hole, by employing a new method of manufacture for producing a new tubular body having a flat area at the point (no distortion) where the threaded hole is formed.

Fig. 4 shows the upper portion of the new tubular body, the clamping screw being omitted to better show the flat area with its improved screw hole.

Fig. 5 shows a top view of the new cable connector, illustrating the screw-mount flat area, sometimes called the "flat-top" of the tubular body.

Fig. 6 shows a section taken through the center of the connector transversely of its axis and showing the flat top, as in Fig. 4.

Fig. 7 illustrates the flat-top connector, gripping a nonmetallic sheathed cable, in readiness to be inserted into the knock-out hole of a conduit box. The box is not shown since it is well known in the art.

The following description of the new method of manufacture and the resulting new connector will make clear the principle of the invention. The same multi-slide machine is used as before, and the conventional strip stock 2 (enlarged at 3 for a better understanding) passes through the machine somewhat as described for the first three views.

The conventional forming dies of the machine first press an external box-gripping groove, shouldered at 12, along each edge of the strip, thus providing a known groove at each end of the new tubular body for this improved connector. Two transverse weakening slots 13 are punched in the grooved strip. These two slots 13 are spaced apart for the purpose of facilitating the forming of a flat and undistortable screw-mounting area in the strip stock.

An extruded and threaded screw hole 14 is formed midway between the two slots 13. Thereupon, the multi-slide machine, with one of its forming dies, grips the flat area, between the two slots 13, and across the threaded hole 14. This die action holds the stock portion flat at the point and in the area where the screw hole 14 is formed, thereby providing a flat-top 15 in the tubular body between the two slots 13. The flat-top 15 is held, positively, against any subsequent curling action and, consequently, the new threaded hole 14 is not distorted, as 6 and 8 in the old practice.

Then follows the die-curling operation, which shapes (curls) the ends of the strip into an annular or tubular body 16. The two free ends of the tubular body portions 16 come relatively close together without touching, thus leaving a lengthwise (axial) slit 17 to free the body of annular rigidity, as noted in Fig. 6. This permits the tubular body 16 to contract and slip into a box knock-out hole in the usual way, under normal pressure exerted (thumb and forefinger) by the workman on the raceway job.

Note that the two space slots 13 remove some of the stock at the point where the annular shaping (curling) is first exerted by the forming dies. Thus relieved, the metallic strip readily bends at the slot, thereby assuring that the flat-top 15 maintains its straight form. In this way, the screw hole 14 is preserved against distortion, and its internal thread helix is of uniform diameter from end to end.

Coming to the completed connector, it is noted that a clamping screw 18 is mounted within the threaded hole 14 formed in the flat-top 15. This clamping screw provides, during its one operation, the same two functions as heretofore described for the conventional connector. The new threaded hole perfects the operation of the conventional screw.

A pressure plate 19 has a shutter end 20 formed at each extremity thereof. The shutters 20 ride up and down the end edges of the tubular body 16, just beyond each external groove 12. It is noted, as in previous practice, that the clamping screw 18 is adapted to be run down (screwed into) the tubular body, and the inner end of the screw delivers its clamping force to the pressure plate 19, the latter being guided and maintained axially within the tubular body by the guiding action of the two shutter plates 20.

Coming to Fig. 7, it is noted that a non-metallic sheathed cable C is loosely placed within the connector (extends through it in the usual way), and that the connector and cable are ready to be set into the round knock-out hole of a wiring box. Either one of the grooves 12 is pushed into the edge of the box hole, and the screw 18 tightened down. The pressure of the screw against the cable C expands the tubular body 16, and causes its engaged groove 12 to grip the box hole edge, thereby anchoring the cable and the connector assembly within the box, as shown in the Peters patent.

This disclosure explains the principles of the invention and the best mode contemplated in applying such principles, so as to distinguish the invention from others; and there is particularly pointed out and distinctly claimed the part, improvement or combination, which constitutes the invention or discovery, as understood by a comparison thereof with the prior art.

This invention is presented to fill a need for a new and useful cable connector. Various modifications in construction, mode of operation, use and method, may and often do occur to others, especially so after acquaintance with an invention. Accordingly, it is to be understood that this disclosure is exemplary of the principles herein and embraces equivalent constructions.

What is claimed is:

1. In a method of die-forming the tubular body of a cable connector made of flat sheet strip material, having a clamping screw, for securing the connector and a cable in a raceway box; that improvement in said method, which comprises the punching of a pair of weakening slots, transversely of the strip, while said strip is flat, on each side of the point where said cable clamping screw is mounted; punching and tapping at said point, also while the strip is flat, thus providing a screw-threaded mounting hole for said cable clamping screw; positively holding the strip flat, in the area between the pair of weakening slots, to maintain said area flat at said point, during the next die-forming step; thereafter die-curling the flat strip into annular shape, from each weakening slot outwardly to each end of the strip, thus producing said tubular body, with its previously formed screw-threaded hole maintained in its originally tapped condition and form, free of thread distortion, throughout the thread helix, for the full axial length of said helix, and for the full thickness of said area held in flat condition during the die-curling operation.

2. In a cable connector, having a body of tubular form, made of flat sheet strip material, the two ends of the tubular strip being contiguous, thereby forming a lengthwise slit in the body, and having a clamping screw mounted in the body, opposite the slit, for gripping a cable in the body and expandibly securing it within a raceway box; that improvement in said tubular body which comprises a flat area, formed opposite the slit, and defined by two spaced weakening slots transversely of the tubular strip; a screw-threaded hole provided perpendicularly through the center of the flat area, into which said clamping screw is rotatably mounted; whereby the pressure of the screw, applied to the cable in the tubular body, acts perpendicularly to the flat area, between the two weakening slots, and expands the tubular body from each weakening slot outwardly toward the slit, thereby preventing distortion of the screw-threaded hole within said flat area.

References Cited in the file of this patent
UNITED STATES PATENTS

| | | |
|---|---|---|
| 946,990 | Swope | Jan. 18, 1910 |
| 1,644,302 | Ledbetter | Oct. 4, 1927 |
| 1,644,308 | Church | Oct. 4, 1927 |
| 1,644,309 | Thomas et al. | Oct. 4, 1927 |
| 1,793,883 | Church | Feb. 24, 1931 |
| 1,816,669 | Church | July 18, 1931 |
| 1,833,988 | Church | Dec. 1, 1931 |
| 1,850,533 | Church | Mar. 22, 1932 |
| 2,445,633 | Peters | July 20, 1948 |
| 2,643,136 | Schesser | June 23, 1953 |
| 2,793,421 | Brumbaugh | May 28, 1957 |